(12) United States Patent
Tchedikian et al.

(10) Patent No.: US 11,282,375 B2
(45) Date of Patent: Mar. 22, 2022

(54) SYSTEM AND METHOD FOR A SMART REMOTE CAROUSEL

(71) Applicant: 7Hugs Labs, Issy-les-Moulineaux (FR)

(72) Inventors: Simon Tchedikian, Issy-les-Moulineaux (FR); Mickael Touillaud, Issy-les-Moulineaux (FR); Pierre Garner, Issy-les-Moulineaux (FR); Thomas Droze, Issy-les-Moulineaux (FR); Julien Colafrancesco, Issy-les-Moulineaux (FR)

(73) Assignee: 7HUGS LABS SAS, Issy-les-Moulineaux (FR)

( * ) Notice: Subject to any disclaimer, the term of this patent is extended or adjusted under 35 U.S.C. 154(b) by 0 days.

(21) Appl. No.: 17/274,410

(22) PCT Filed: Sep. 6, 2019

(86) PCT No.: PCT/IB2019/057547
§ 371 (c)(1),
(2) Date: Mar. 8, 2021

(87) PCT Pub. No.: WO2020/049527
PCT Pub. Date: Mar. 12, 2020

(65) Prior Publication Data
US 2021/0272447 A1   Sep. 2, 2021

Related U.S. Application Data

(60) Provisional application No. 62/728,731, filed on Sep. 7, 2018.

(51) Int. Cl.
*G08C 17/02* (2006.01)
*G06F 3/0488* (2013.01)
*G06F 3/04883* (2022.01)

(52) U.S. Cl.
CPC ......... *G08C 17/02* (2013.01); *G06F 3/04883* (2013.01); *G08C 2201/31* (2013.01);
(Continued)

(58) Field of Classification Search
CPC ............... G08C 17/02; G08C 2201/31; G08C 2201/32; G08C 2201/92; G08C 2201/30;
(Continued)

(56) References Cited

U.S. PATENT DOCUMENTS 10,347,118 B2 * 7/2019 Griffin .................. G08C 17/02
2003/0095156 A1 * 5/2003 Klein ............... H04N 21/42204
715/864

(Continued)

FOREIGN PATENT DOCUMENTS

| WO | 03044625 A2 | 5/2003 |
| WO | 2015102467 A1 | 7/2015 |
| WO | 2016191875 A1 | 12/2016 |

OTHER PUBLICATIONS

International Search Report and Written Opinion for International Patent Application No. PCT/IB2019/057547, dated Nov. 12, 2019, 8 pages.

*Primary Examiner* — Omeed Alizada
(74) *Attorney, Agent, or Firm* — Withrow & Terranova, P.L.L.C.

(57) ABSTRACT

Provided is a system, method, and apparatus for controlling a plurality of devices. The system includes a remote control device comprising a processor configured to generate a carousel zone comprising at least a subset of graphical icons of a plurality of graphical icons, determine a first target device and a second target device from the plurality of devices, generate a first user interface based on the first target device, the first user interface associated with a first set of commands, in response to a user input, generate a second user interface based on the second target device, the (Continued)

second user interface associated with a second set of commands, control the first target device based on the first set of commands, and control the second target device based on the second set of commands.

28 Claims, 7 Drawing Sheets

(52) U.S. Cl.
CPC ..... *G08C 2201/32* (2013.01); *G08C 2201/42* (2013.01); *G08C 2201/91* (2013.01); *G08C 2201/92* (2013.01)

(58) Field of Classification Search
CPC ............ G08C 2201/91; G08C 2201/21; G08C 2201/93; G06F 3/04883; G06F 3/0481; G06F 3/0484; G06F 3/04817; G06F 3/0482
See application file for complete search history.

(56) References Cited

U.S. PATENT DOCUMENTS

| | | | |
|---|---|---|---|
| 2006/0101498 A1* | 5/2006 | Arling | H04N 21/84 725/81 |
| 2006/0150120 A1* | 7/2006 | Dresti | G08C 23/04 715/810 |
| 2013/0147612 A1* | 6/2013 | Hong | H04W 4/50 340/12.54 |

* cited by examiner

SYSTEM AND METHOD FOR A SMART REMOTE CAROUSEL

CROSS-REFERENCE TO RELATED APPLICATION

This application is a 35 USC 371 national phase filing of International Application No. PCT/IB 2019/057547, filed Sep. 6, 2019, which claims priority to U.S. provisional patent application No. 62/728,731, the disclosures of which are incorporated herein by reference in their entireties.

FIELD

This disclosure relates to remote control devices and, in non-limiting embodiments, to systems, methods, and apparatuses for controlling a plurality of devices with a remote control device, such as residential home theater systems comprising disk players, media streamers, home media servers, display screens, video gaming consoles, service provider devices, sound systems, A/V receivers (audio/video receivers or AVRs), and voice-controlled home automation systems.

BACKGROUND

The use of smart devices throughout residential homes has become ubiquitous. Smart devices typically include devices coupled to a WiFi® network and controllable by a user's device connected to the same WiFi® network. Some example smart devices leveraged by home owners include TVs, thermostats, lights, and audio equipment (e.g., AMAZON ALEXA®). Having smart devices connected throughout the home or office requires separate control interfaces to communicate with each connected smart device. A method currently employed is to leverage distinct mobile applications on a mobile device where each particular mobile application may be used to control a specific one of the connected smart devices. Consequently, the user is required to physically open different applications on the user's mobile device to control each smart device. Opening and then toggling between different mobile applications on the user's mobile device is inefficient, cumbersome, time consuming, and prone to errors. Another existing method is to leverage a universal remote with fixed input buttons to control various devices. This is cumbersome and prone to errors because for each device there exists a number of irrelevant input buttons on the universal remote.

As such, it is desirable to establish a system and method that creates a seamless user experience to control multiple smart devices in an efficient and reliable manner.

SUMMARY

According to non-limiting embodiments or aspects, provided is a system for controlling a plurality of devices, comprising: a remote control device comprising a display and a processor, the processor configured to: generate, on the display, a carousel zone comprising at least a subset of graphical icons of a plurality of graphical icons, wherein each graphical icon of the plurality of graphical icons is associated with a respective device of the plurality of devices; determine a first target device and a second target device from the plurality of devices based on at least one of: (i) receiving a selection by a user of a graphical icon of the at least one graphical icon displayed on the carousel zone, and (ii) detecting the first target device and/or second target device with a sensor in communication with the remote control device; generate, on the display, a first user interface based on the first target device, the first user interface associated with a first set of commands; in response to a user input, generate, on the display, a second user interface based on the second target device, the second user interface associated with a second set of commands; control the first target device based on the first set of commands; and control the second target device based on the second set of commands.

In non-limiting embodiments or aspects, the user input comprises a physical gesture on or with the control device. In non-limiting embodiments or aspects, the first user interface is stored as a primary interface layer and the second user interface is stored as a secondary interface layer. In non-limiting embodiments or aspects, the processor is further configured to: in response to a second gesture, generate, on the display, a third user interface based on a third target device, the third user interface associated with a third set of commands. In non-limiting embodiments or aspects, the first target device is determined based on detecting the first target device with the sensor in communication with the remote control device, and the processor is configured to determine the first target device based on a location and orientation of the remote control device.

In non-limiting embodiments or aspects, the processor is further configured to define a spatial selection zone based on the location and orientation of the remote control device. In non-limiting embodiments or aspects, the spatial selection zone includes a plurality of spatial coordinates having associated selection probabilities, and the processor is further configured to: identify a first device located at first spatial coordinates of the plurality of spatial coordinates, the first spatial coordinates having a first probability value; identify a second device located at second coordinates of the plurality of spatial coordinates, the second spatial coordinates having a second probability value; and determine that the second probability value is less than the first probability value, the target device is determined to be the first device based on the second probability value being less than the first probability value. In non-limiting embodiments or aspects, the processor is further configured to determine the first probability value and the second probability value based on a dynamic spatial selection algorithm. In non-limiting embodiments or aspects, the spatial selection zone includes a plurality of spatial coordinates having associated selection probabilities, and the processor is further configured to: identify a first device located at first spatial coordinates of the plurality of spatial coordinates, the first spatial coordinates having a first probability value; identify a second device located at second coordinates of the plurality of spatial coordinates, the second spatial coordinates having a second probability value; and determine that a difference between the second probability value and the first probability value is less than a threshold value; and display, on the carousel zone, a first graphical icon corresponding to the first device and a second graphical icon corresponding to the second device, the first target device is selected based on a user selection of the first graphical icon or the second graphical icon.

In non-limiting embodiments or aspects, the sensor comprises an inertial measurement unit (IMU) configured to identify the orientation of the remote control device. In non-limiting embodiments or aspects, further comprising a microphone configured to receive a voice input from a user, the processor is further configured to: process the voice input into a command based on at least one of the first target device and the second target device; and control at least one of the first target device and the second target device based on the command. In non-limiting embodiments or aspects, further comprising determining between the first target device and the second target device for processing the voice input into the command based on whether the first user interface or the second user interface is displayed. In non-limiting embodiments or aspects, the plurality of devices are smart devices interconnected through at least one wireless network. In non-limiting embodiments or aspects, the carousel zone is displayed on a main user interface, and the first user interface and second user interface are displayed as a control zone on the main user interface. In non-limiting embodiments or aspects, the processor is further configured to: in response to a gesture on the first user interface, generate, on the display, a third user interface based on the first target device, the third user interface associated with a third set of commands configured to control the first target device, the third set of commands are different from the first set of commands.

According to non-limiting embodiments or aspects, provided is a method for controlling a plurality of devices, comprising: generating, on a display of a remote control device, a carousel zone comprising at least a subset of graphical icons of a plurality of graphical icons, wherein each graphical icon of the plurality of graphical icons is associated with a respective device of the plurality of devices; determining, with the remote control device, a first target device and a second target device from the plurality of devices based on at least one of: (i) receiving a selection by a user of a graphical icon of the at least one graphical icon displayed on the carousel zone, and (ii) detecting the first target device and/or second target device with a sensor in communication with the remote control device; generating, on the display of the remote control device, a first user interface based on the first target device, the first user interface associated with a first set of commands; in response to a user input, generate, on the display of the control device, a second user interface based on the second target device, the second user interface associated with a second set of commands; control, with the remote control device, the first target device based on the first set of commands; and control, with the remote control device, the second target device based on the second set of commands.

In non-limiting embodiments or aspects, the user input comprises a physical gesture on or with the control device. In non-limiting embodiments or aspects, the first user interface is stored as a primary interface layer and the second user interface is stored as a secondary interface layer. In non-limiting embodiments or aspects, the method further comprises: in response to a second gesture, generating, on the display, a third user interface based on a third target device, the third user interface associated with a third set of commands. In non-limiting embodiments or aspects, the first target device is determined based on detecting the first target device with the sensor in communication with the remote control device, and the method further comprises determining the first target device based on a location and orientation of the remote control device.

In non-limiting embodiments or aspects, the method further comprises defining a spatial selection zone based on the location and orientation of the remote control device. In non-limiting embodiments or aspects, the spatial selection zone includes a plurality of spatial coordinates having associated selection probabilities, the method further comprises: identifying a first device located at first spatial coordinates of the plurality of spatial coordinates, the first spatial coordinates having a first probability value; identifying a second device located at second coordinates of the plurality of spatial coordinates, the second spatial coordinates having a second probability value; and determining that the second probability value is less than the first probability value, the target device is determined to be the first device based on the second probability value being less than the first probability value. In non-limiting embodiments or aspects, the method further comprises determining the first probability value and the second probability value based on a dynamic spatial selection algorithm. In non-limiting embodiments or aspects, the spatial selection zone includes a plurality of spatial coordinates having associated selection probabilities, the method further comprises: identifying a first device located at first spatial coordinates of the plurality of spatial coordinates, the first spatial coordinates having a first probability value; identifying a second device located at second coordinates of the plurality of spatial coordinates, the second spatial coordinates having a second probability value; and determining that a difference between the second probability value and the first probability value is less than a threshold value; and displaying, on the carousel zone, a first graphical icon corresponding to the first device and a second graphical icon corresponding to the second device, the first target device is selected based on a user selection of the first graphical icon or the second graphical icon.

In non-limiting embodiments or aspects, the sensor comprises an inertial measurement unit (IMU) configured to identify the orientation of the remote control device. In non-limiting embodiments or aspects, the method further comprises: processing a voice input into a command based on at least one of the first target device and the second target device; and controlling at least one of the first target device and the second target device based on the command. In non-limiting embodiments or aspects, the method further comprises determining between the first target device and the second target device for processing the voice input into the command based on whether the first user interface or the second user interface is displayed. In non-limiting embodiments or aspects, the plurality of devices are smart devices interconnected through at least one wireless network. In non-limiting embodiments or aspects, the carousel zone is displayed on a main user interface, and the first user interface and second user interface are displayed as a control zone on the main user interface. In non-limiting embodiments or aspects, the method further comprises: in response to a gesture on the first user interface, generating, on the display, a third user interface based on the first target device, the third user interface associated with a third set of commands configured to control the first target device, the third set of commands are different from the first set of commands.

According to non-limiting embodiments or aspects, provided is a computer program product for controlling a plurality of devices, comprising at least one non-transitory computer-readable medium including program instructions that, when executed by at least one processor of a remote control device, causes the at least one processor to: generate, on a display, a carousel zone comprising at least a subset of graphical icons of a plurality of graphical icons, wherein each graphical icon of the plurality of graphical icons is associated with a respective device of the plurality of devices; determine a first target device and a second target device from the plurality of devices based on at least one of: (i) receiving a selection by a user of a graphical icon of the at least one graphical icon displayed on the carousel zone, and (ii) detecting the first target device and/or second target device with a sensor in communication with the remote control device; generate, on the display, a first user interface based on the first target device, the first user interface associated with a first set of commands; in response to a user input, generate, on the display, a second user interface based on the second target device, the second user interface associated with a second set of commands; control the first target device based on the first set of commands; and control the second target device based on the second set of commands.

According to non-limiting embodiments or aspects, provided is a system for controlling a plurality of devices via a control device, the system comprising: a user interface (UI) controller configured to actuate display on the control device of select ones of a plurality of User Interfaces (UIs) associated with respective ones of the plurality of devices, the plurality of UIs are operable to control operation of respective ones of the plurality of devices; a selection engine communicatively coupled to the control device and configured to define a spatial selection zone based on a location and orientation of the control device, the spatial selection zone includes a plurality of spatial coordinates having associated selection probabilities, the selection engine further configured to identify a first device of the plurality of devices located at a first one of the plurality of spatial coordinates having a first probability value of the selection probabilities and identify a second device located at a second one of the plurality of spatial coordinates having a second probability value of the selection probabilities, the second probability value being less than the first probability value; and a carousel module coupled to the selection engine and the UI controller, the carousel module comprising a primary interface layer and a secondary interface layer, the primary interface layer stores a first UI of the plurality of UIs associated with the first device while the secondary interface layer stores a second UI of the plurality of UIs associated with the second device, the UI controller actuates the carousel module to display the first UI from the primary interface layer responsive to identification of the first device located at the first one of the plurality of spatial coordinates having the first probability value, and actuates display of at least the second UI from the secondary interface layer responsive to a user command via the control device.

In non-limiting embodiments or aspects, the devices are smart devices interconnected through at least one of a WiFi® network, UWB network, RF network, or the like. In non-limiting embodiments or aspects, further comprising a beacon system to determine the location of the control device based, at least in part, on Ultra Wide Band signal strength. In non-limiting embodiments or aspects, the beacon system comprises: a plurality of sensors communicatively coupled to one another; and a location positioning system (LPS) receiver embedded within the control device, the LPS receiver operable to communicate with the plurality of sensors to identify the location of the control device. In non-limiting embodiments or aspects, the control device further comprises an inertial measurement unit (IMU) configured to identify the orientation of the control device. In non-limiting embodiments or aspects, the inertial measurement unit comprises at least one of a magnetometer, gyroscope, accelerometer and distance sensor. In non-limiting embodiments or aspects, the selection engine identifies the selection probabilities associated with the plurality of spatial coordinates based on a dynamic spatial selection algorithm. In non-limiting embodiments or aspects, the selection engine dynamically updates the spatial selection zone responsive to real-time location and orientation data of the control device. In non-limiting embodiments or aspects, the first probability value of the first device is greater than all the selection probabilities. In non-limiting embodiments or aspects, the difference between the second probability value of the second device and the first probability value of the first device is a defined threshold amount. In non-limiting embodiments or aspects, the control device is at least one of a smart remote, smart phone, or mobile computing device.

According to non-limiting embodiments or aspects, provided is a method for controlling a plurality of devices via a control device, the method comprising: defining a spatial selection zone based on a location and orientation of the control device, the spatial selection zone includes a plurality of spatial coordinates having associated selection probabilities; identifying a first device of the plurality of devices located at a first one of the plurality of spatial coordinates having a first probability value of the selection probabilities and identifying a second device located at a second one of the plurality of spatial coordinates having a second probability value of the selection probabilities, the second probability value being less than the first probability value; storing a first user interface (UI) of a plurality of user interfaces (UIs) in a primary interface layer of a carousel module, the plurality of UIs respectively associated with the plurality of devices, the first UI is associated with the first device; storing at least a second user interface (UI) of the plurality of UIs in a second interface layer of the carousel module, the second UI associated with the second device; and actuating the carousel module to display contents of the primary interface layer responsive to identifying the first device located at the first one of the plurality of spatial coordinates having the first probability value, and actuating the carousel module to display contents of the secondary interface layer responsive to a user command via the control device. In non-limiting embodiments or aspects, wherein actuating the carousel module to display contents of the secondary interface layer includes actuating display of the second UI associated with the second device responsive to detecting a user gesture on the control device.

In non-limiting embodiments or aspects, detecting the user gesture includes detecting a swipe action by the user on the control device. In non-limiting embodiments or aspects, the method further comprises identifying a third device located at a third one of the plurality of spatial coordinates having a third probability value, the third probability value being less than the second probability value and within a defined probability threshold. In non-limiting embodiments or aspects, actuating the carousel module further includes displaying on the control device a third UI associated with the third device responsive to detecting a further user gesture on the control device. In non-limiting embodiments or aspects, the method further comprises determining the location of the control device based, at least in part, on identifying a position of the control device relative a plurality of beacons.

In non-limiting embodiments or aspects, determining the location of the control device includes calculating time of travel of a radio signal between the control device and the plurality of beacons. In non-limiting embodiments or aspects, determining the location of the control device includes calculating an amount of received power of a radio signal at the control device or at the plurality of beacons. In non-limiting embodiments or aspects, determining the location of the control device includes determining an angle of reception of a radio signal received by the control device or by at least one of the plurality of beacons. In non-limiting embodiments or aspects, the method further comprises determining the orientation of the control device by identifying physical variables of the control device in a defined space of the plurality of beacons. In non-limiting embodiments or aspects, identifying the physical variables includes capturing the physical variables by at least one of an accelerometer, a gyroscope, or a terrestrial magnetic field sensor.

Further non-limiting aspects or embodiments are set forth in the following numbered clauses:

Clause 1: A system for controlling a plurality of devices, comprising: a remote control device comprising a display and a processor, the processor configured to: generate, on the display, a carousel zone comprising at least a subset of graphical icons of a plurality of graphical icons, wherein each graphical icon of the plurality of graphical icons is associated with a respective device of the plurality of devices; determine a first target device and a second target device from the plurality of devices based on at least one of: (i) receiving a selection by a user of a graphical icon of the at least one graphical icon displayed on the carousel zone, and (ii) detecting the first target device and/or second target device with a sensor in communication with the remote control device; generate, on the display, a first user interface based on the first target device, the first user interface associated with a first set of commands; in response to a user input, generate, on the display, a second user interface based on the second target device, the second user interface associated with a second set of commands; control the first target device based on the first set of commands; and control the second target device based on the second set of commands.

Clause 2: The system of clause 1, wherein the user input comprises a physical gesture on or with the control device.

Clause 3: The system of clauses 1 or 2, wherein the first user interface is stored as a primary interface layer and the second user interface is stored as a secondary interface layer.

Clause 4: The system of any of clauses 1-3, wherein the processor is further configured to: in response to a second gesture, generate, on the display, a third user interface based on a third target device, the third user interface associated with a third set of commands.

Clause 5: The system of any of clauses 1-4, wherein the first target device is determined based on detecting the first target device with the sensor in communication with the remote control device, and wherein the processor is configured to determine the first target device based on a location and orientation of the remote control device.

Clause 6: The system of any of clauses 1-5, wherein the processor is further configured to define a spatial selection zone based on the location and orientation of the remote control device.

Clause 7: The system of any of clauses 1-6, wherein the spatial selection zone includes a plurality of spatial coordinates having associated selection probabilities, and wherein the processor is further configured to: identify a first device located at first spatial coordinates of the plurality of spatial coordinates, the first spatial coordinates having a first probability value; identify a second device located at second coordinates of the plurality of spatial coordinates, the second spatial coordinates having a second probability value; and determine that the second probability value is less than the first probability value, wherein the target device is determined to be the first device based on the second probability value being less than the first probability value.

Clause 8: The system of any of clauses 1-7, wherein the processor is further configured to determine the first probability value and the second probability value based on a dynamic spatial selection algorithm.

Clause 9: The system of any of clauses 1-8, wherein the spatial selection zone includes a plurality of spatial coordinates having associated selection probabilities, and wherein the processor is further configured to: identify a first device located at first spatial coordinates of the plurality of spatial coordinates, the first spatial coordinates having a first probability value; identify a second device located at second coordinates of the plurality of spatial coordinates, the second spatial coordinates having a second probability value; and determine that a difference between the second probability value and the first probability value is less than a threshold value; and display, on the carousel zone, a first graphical icon corresponding to the first device and a second graphical icon corresponding to the second device, wherein the first target device is selected based on a user selection of the first graphical icon or the second graphical icon.

Clause 10: The system of any of clauses 1-9, wherein the sensor comprises an inertial measurement unit (IMU) configured to identify the orientation of the remote control device.

Clause 11: The system of any of clauses 1-10, further comprising a microphone configured to receive a voice input from a user, wherein the processor is further configured to: process the voice input into a command based on at least one of the first target device and the second target device; and control at least one of the first target device and the second target device based on the command.

Clause 12: The system of any of clauses 1-11, further comprising determining between the first target device and the second target device for processing the voice input into the command based on whether the first user interface or the second user interface is displayed.

Clause 13: The system of any of clauses 1-12, wherein the plurality of devices are smart devices interconnected through at least one wireless network.

Clause 14: The system of any of clauses 1-13, wherein the carousel zone is displayed on a main user interface, and wherein the first user interface and second user interface are displayed as a control zone on the main user interface.

Clause 15: The system of any of clauses 1-14, wherein the processor is further configured to: in response to a gesture on the first user interface, generate, on the display, a third user interface based on the first target device, the third user interface associated with a third set of commands configured to control the first target device, wherein the third set of commands are different from the first set of commands.

Clause 16: A method for controlling a plurality of devices, comprising: generating, on a display of a remote control device, a carousel zone comprising at least a subset of graphical icons of a plurality of graphical icons, wherein each graphical icon of the plurality of graphical icons is associated with a respective device of the plurality of devices; determining, with the remote control device, a first target device and a second target device from the plurality of devices based on at least one of: (i) receiving a selection by a user of a graphical icon of the at least one graphical icon displayed on the carousel zone, and (ii) detecting the first target device and/or second target device with a sensor in communication with the remote control device; generating, on the display of the remote control device, a first user interface based on the first target device, the first user interface associated with a first set of commands; in response to a user input, generate, on the display of the control device, a second user interface based on the second target device, the second user interface associated with a second set of commands; control, with the remote control device, the first target device based on the first set of commands; and control, with the remote control device, the second target device based on the second set of commands.

Clause 17: The method of clause 16, wherein the user input comprises a physical gesture on or with the control device.

Clause 18: The method of clauses 16 or 17, wherein the first user interface is stored as a primary interface layer and the second user interface is stored as a secondary interface layer.

Clause 19: The method of any of clauses 16-18, further comprising: in response to a second gesture, generating, on the display, a third user interface based on a third target device, the third user interface associated with a third set of commands.

Clause 20: The method of any of clauses 16-19, wherein the first target device is determined based on detecting the first target device with the sensor in communication with the remote control device, further comprising determining the first target device based on a location and orientation of the remote control device.

Clause 21: The method of any of clauses 16-20, further comprising defining a spatial selection zone based on the location and orientation of the remote control device.

Clause 22: The method of any of clauses 16-21, wherein the spatial selection zone includes a plurality of spatial coordinates having associated selection probabilities, further comprising: identifying a first device located at first spatial coordinates of the plurality of spatial coordinates, the first spatial coordinates having a first probability value; identifying a second device located at second coordinates of the plurality of spatial coordinates, the second spatial coordinates having a second probability value; and determining that the second probability value is less than the first probability value, wherein the target device is determined to be the first device based on the second probability value being less than the first probability value.

Clause 23: The method of any of clauses 16-22, further comprising determining the first probability value and the second probability value based on a dynamic spatial selection algorithm.

Clause 24: The method of any of clauses 16-23, wherein the spatial selection zone includes a plurality of spatial coordinates having associated selection probabilities, further comprising: identifying a first device located at first spatial coordinates of the plurality of spatial coordinates, the first spatial coordinates having a first probability value; identifying a second device located at second coordinates of the plurality of spatial coordinates, the second spatial coordinates having a second probability value; and determining that a difference between the second probability value and the first probability value is less than a threshold value; and displaying, on the carousel zone, a first graphical icon corresponding to the first device and a second graphical icon corresponding to the second device, wherein the first target device is selected based on a user selection of the first graphical icon or the second graphical icon.

Clause 25: The method of any of clauses 16-24, wherein the sensor comprises an inertial measurement unit (IMU) configured to identify the orientation of the remote control device.

Clause 26: The method of any of clauses 16-25, further comprising: processing a voice input into a command based on at least one of the first target device and the second target device; and controlling at least one of the first target device and the second target device based on the command.

Clause 27: The method of any of clauses 16-26, further comprising determining between the first target device and the second target device for processing the voice input into the command based on whether the first user interface or the second user interface is displayed.

Clause 28: The method of any of clauses 16-27, wherein the plurality of devices are smart devices interconnected through at least one wireless network.

Clause 29: The method of any of clauses 16-28, wherein the carousel zone is displayed on a main user interface, and wherein the first user interface and second user interface are displayed as a control zone on the main user interface.

Clause 30: The method of any of clauses 16-29, further comprising: in response to a gesture on the first user interface, generating, on the display, a third user interface based on the first target device, the third user interface associated with a third set of commands configured to control the first target device, wherein the third set of commands are different from the first set of commands.

In one embodiment, provided is a system for controlling a plurality of devices via a remote control device. The system includes a memory for storing a plurality of graphical icons associated with respective ones of the plurality of devices; a carousel interface configured to display on the remote control device at least one of the graphical icons; a selection widget configured to select, in a manual operating mode, a target device from the plurality of devices responsive to a selection by a user of one of the graphical icons displayed by the carousel interface; a sensor configured to select, in an automatic operating mode, the target device from the plurality of devices responsive to a detection by the sensor of one of the plurality of devices; and a device control interface configured to display a first user interface on the remote control device, the device control interface being operable to control the target device with a first set of commands associated with the first user interface.

In another embodiment, provided is a method for controlling a plurality of devices via a control device. The method includes storing a plurality of graphical icons associated with respective ones of the plurality of devices; displaying at least one of the graphical icons on the remote control device; selecting, in a manual operating mode, a target device from the plurality of devices responsive to a selection by a user of one of the graphical icons; selecting, in an automatic operating mode, the target device from the plurality of devices responsive to a detection by the sensor of one of the plurality of devices; and displaying, on a device control interface, a first user interface on the remote control device, and controlling the target device with a first set of commands associated with the first user interface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1A:
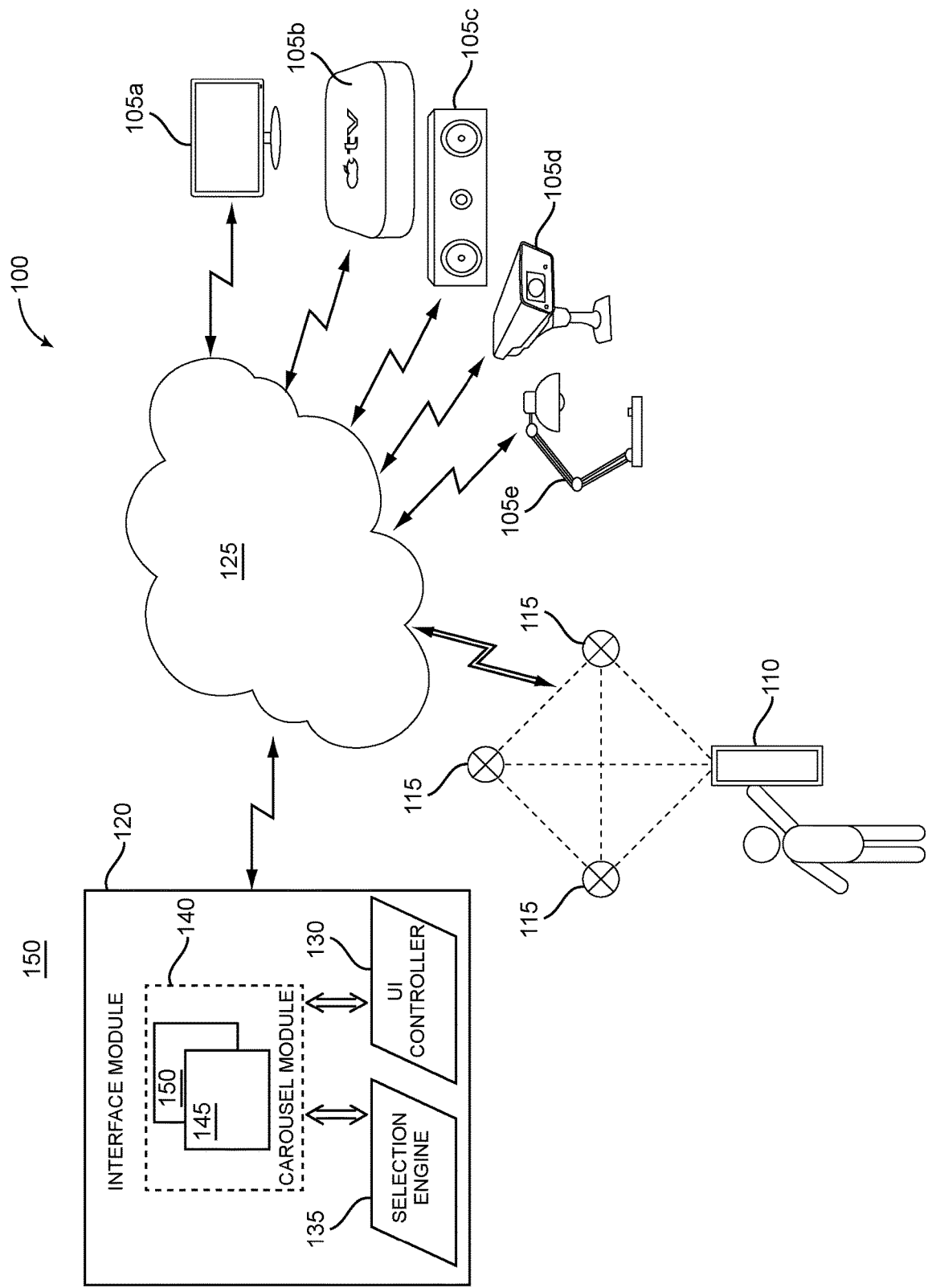
FIG. 1A is a schematic illustration of a system for controlling a plurality of devices via a control device, according to one illustrated and non-limiting embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various examples of embodiments of the invention will now be described. The following description provides specific details for a thorough understanding and enabling description of these examples. One skilled in the relevant art will understand, however, that embodiments of the invention may be practiced without many of these details. Likewise, one skilled in the relevant art will also understand that embodiments incorporate many other obvious features not described in detail herein. Additionally, some well-known structures or functions may not be shown or described in detail below, so as to avoid unnecessarily obscuring the relevant description.

The terminology used herein is to be interpreted in its broadest reasonable manner, even though it is being used in conjunction with a detailed description of certain specific examples of the invention. Indeed, certain terms may even be emphasized below; any terminology intended to be interpreted in any restricted manner will, however, be overtly and specifically defined as such in this Detailed Description section. The figures along with the following discussion provide a brief, general description of a suitable environment in which embodiments of the invention can be implemented.

As used herein, the term "computing device" may refer to one or more electronic devices configured to process data. A computing device may, in some examples, include the necessary components to receive, process, and output data, such as a display, a processor, a memory, an input device, and a network interface. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may also be a desktop computer or other form of non-mobile computer, mainframe computer, media player, and/or the like. An "Application Programming Interface" (API) refers to computer code or other data stored on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen etc.).

Indeed, the terms "computing device," "computer," "server," and the like are generally used interchangeably herein, and refer to any of the above devices and systems, as well as any data processor.

While non-limiting embodiments of the disclosure, such as certain functions, may be described as being performed on a single device, embodiments of the invention can also be practiced in distributed environments where functions or modules are shared among disparate computing devices, which are linked through a communications network, such as, for example, a Local Area Network (LAN), Wide Area Network (WAN), the Internet®, Bluetooth®, Zigbee®, and/or the like. In a distributed computing environment, program modules may be located in both local and remote memory storage devices.

Non-limiting embodiments of the invention may be stored or distributed on tangible, non-transitory computer-readable media, including magnetically or optically readable computer discs, cloud servers, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of embodiments of the invention may be distributed over the Internet and via cloud computing networks or on any analog or digital network (packet switched, circuit switched, or other scheme).

The computer readable medium stores computer data, which data may include computer program code that is executable by a computer, in machine readable form. By way of example, a computer readable medium may comprise computer readable storage media, for tangible or fixed storage of data, or communication media for transient interpretation of code-containing signals. Computer readable storage media, as used herein, refers to physical or tangible storage (as opposed to transitory signals) and includes without limitation volatile and non-volatile, removable and non-removable media implemented in any method or technology for the tangible storage of information such as computer-readable instructions, data structures, program modules or other data. Computer readable storage media includes, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Non-limiting embodiments of the invention are described herein with reference to operational illustration of modules having functional blocks to illustrate methods employed by modules to control a plurality of smart devices via a control device where user interfaces associated with the smart devices are transitionally displayed on the control device. It will be understood that each of the modules, blocks, engines, and combinations thereof may be implemented by analog or digital hardware and computer program instructions. The computer program instructions may be provided to a processor of a computing device, such as a general purpose computer, special purpose computer, application-specific integrated circuit (ASIC), or other programmable data processing apparatus such that the instructions, which execute via the processor of the computer or other programmable data processing apparatus, implements the functions/acts specified in the functional blocks of the flowcharts and/or the operational modules.

In some non-limiting embodiments, the methods illustrated by the functional blocks may occur out of the order noted in the operational illustration of the modules. For example, two blocks shown in succession may be executed substantially concurrently. Alternatively and/or additionally, the blocks may be executed in reverse order.

A module is a software, hardware, or firmware (or combination thereof) system, process or functionality, or component thereof, that performs or facilitates the processes, features, and/or functions described herein. A module may include sub-modules or engines. Software components of a module may be stored on a computer readable medium. Modules may be integral to one or more servers, or be loaded and executed by one or more servers. One or more modules may be grouped into an application.

FIG. 1A shows a schematic illustration of a system 100 for controlling a plurality of devices 105a-e (collectively referenced herein as 105) via a control device 110, according to one illustrated and non-limiting embodiment. The control device 110 may be a multi-purpose computing device, such as a smartphone, or may be a device purposed to be used as a control device for a plurality of different devices (e.g., a remote control device).

The system 100 comprises a plurality of beacons 115 communicatively coupled to each other and to the control device 110. The system 100 further includes an interface module 120 communicatively coupled to the control device 110, the plurality of beacons 115, and the plurality of devices 105 via a network 125. The network 125 may, for example, comprise a Local Area Network (LAN), Wide Area Network (WAN), and/or the like, and may include the Internet, Infrared, Bluetooth®, or Zigbee® networks, and/or the like.

The plurality of devices 105 may be "smart" devices such as electronic or electro-mechanical devices communicatively coupled to the network 125. In one non-limiting embodiment, the plurality of devices 105 may take the form of a smart TV 105a, set top box 105b, sound system 105c, security camera 105d, and/or lamp 105e. Each of the plurality of devices 105 have associated plurality of user interfaces (UIs) 402 (to be described in more detail with reference to FIGS. 4A-5B) operable to control operations of the devices 105. As will be discussed in more detail below, the system 100 operates to display select ones of the plurality of UIs 402 in response to a determination of the device 105 intended for control by the control device 110. The plurality of UIs 402 are configured for display on the control device 110 to allow a user of the control device 110 to operate respective ones of the devices 105. The plurality of UIs 402 may take the form of graphical user interfaces (GUIs) advantageously configured for display on a mobile device. It will be appreciated to those of ordinary skill in the art that any type of "smart" device is contemplated by the disclosure and the examples disclosed herein are merely for illustrative purposes.

The "devices" referenced herein additionally include any remote server, computer, or processor configured to have an application operating thereon. For example, a "device" may refer to a server located remote from the control device 110 and having a ride-sharing application, such as Uber® or Lyft®, running thereon. It will be appreciated by those of ordinary skill in the art that the application operating on the "device" may comprise any type of mobile or non-mobile application that may be downloadable from, for example, an Apple® or Android® online store, and the application is not limited to a particular type of application. As such, controlling the "device" includes controlling the application (e.g., ride-sharing application, HULU®, NETFLIX®, Weather Application, and/or the like) running on the device. Furthermore, although reference is made herein to "control" or "controlling" of devices, this also includes monitoring applications running on the devices.

The plurality of beacons 115 are configured to communicate and operate in conjunction with the control device 110 to determine a spatial position of the control device 110 in real-time. The plurality of beacons 115 may take the form of localization units and may communicate with the control device 110 via any short-wave or long-wave communication protocol. For example, the beacons 115 may utilize environment localization chips based on ultra wideband (UWB) technology to determine relative positions in relation to one another. The localization of the beacons 115 may be implemented based on lateration, tri-lateration, or multi-lateration methods. As another example, electromagnetic field (EMF) technology is another technology capable of determining position and orientation. The same localization methods leveraged by the beacons 115 to determine relative positions may be leveraged by the system 100 to determine the location of the control device 110 relative the beacons 115. As will be described below, because the plurality of beacons 115 are associated with the control device 110, the control device 110 is capable to determine its relative position with respect to the plurality of beacons 115.

In one example non-limiting embodiment, the beacons 115 may be spatially arranged in an operating environment of the system 100 such that a line-of-site exists between the plurality of beacons 115. The beacons 115 may, for example, be mounted on a top portion of various wall surfaces to allow a substantially unobstructed communication path between the beacons 115 and between the beacons 115 and the control device 110. The plurality of beacons 115 may communicate wirelessly with one another and with the control device 110 to implement location positioning via the UWB communication protocols.

The control device 110 may be operable to control one or more of the plurality of devices 105 via the plurality of UIs 402. In particular, commands may be transmitted between the control device 110 and the plurality of devices 105 via at least one of Infrared (IR), Bluetooth®, Zigbee®, WiFi®, UWB, or the like. For example, the control device 110 and the plurality of devices 105 may transmit and receive commands via the network 125.

In non-limiting embodiments, the control device 110 may take the form of a smart remote, smart phone, tablet, or any mobile computing device configured to transmit commands to the plurality of devices 105 either directly or via the network 125. The control device 110 may take the form of a universal remote configured to display respective ones of the plurality of UIs 402 associated with the plurality of devices 105. The UIs displayed on the control device 110 may be indicative of the particular one of the plurality of devices 105 the control device 110 is targeting. For example, responsive to the control device 110 pointing toward the device 105a, the UI associated with the device 105a may be displayed on the control device 110. In another non-limiting embodiment, responsive to the control device 110 pointing toward a vicinity of a first and second one of the plurality of devices 105, a first UI may be automatically displayed on the control device 110 while a second UI is available for display in response to a user input. The first UI may be the control interface associated with the first device 105a while the second UI may be the control interface associated with the second device 105b. As will be described in more detail below, the system 100 is operable to implement a Dynamic Spatial Selection Algorithm (DSSA) to determine a likelihood that the first and second devices 105a, 105b are targeted by the control device 110. The disclosed system is configured to establish a prioritized order of the devices 105, based on which the respective user interfaces may be displayed on the control device 110. In one example, geolocation and spatial information of the control device 110 and the devices 105 may be leveraged to choose a likely target device to have an associated user interface displayed on the control device 110. However, other examples may leverage image analysis of potential ones of the devices 105 or user habits through artificial intelligence to choose the likely target device of the control device 110. Reference herein to the example of leveraging geolocation and spatial information of the control device 110 and the devices 105 is one application of identifying likely target devices for determining the prioritized order of the devices 105, and other methods (e.g., image analysis, past user behavior, etc.) are also applicable.

In another non-limiting embodiment (as will be referred later to a "fixed mode"), the control device 110 may have stored thereon, or have access to, all the plurality of UIs 402 respectively associated with the plurality of devices 105 available for display in response to the user input. For example, the user input may take the form of a physical gesture (e.g., a manual gesture) on or with the control device 110 by the user such as, for example, swiping on a UI in a direction, shaking or tilting the control device 110, and/or the like. The physical gesture or other form of user input may result in a transition between respective ones of the plurality of UIs 402 on the control device 110 regardless of a position and orientation of the control device 110.

The interface module 120 comprises a user interface (UI) controller 130, a selection engine 135, and a carousel module 140. In one non-limiting embodiment, the UI controller 130, the selection engine 135, and the carousel module 140 are remotely located and communicatively coupled to one another via a network such as Wi-Fi® or the like. The carousel module 140 further comprises a primary interface layer 145 and a secondary interface layer 150. The primary interface layer 145 is configured to store the first UI of the plurality of UIs 402 while the secondary interface layer 150 is configured to store at least the second UI of the plurality of UIs 402. In one non-limiting embodiment, the secondary interface layer 150 stores one or more of the plurality of UIs 402, while the primary interface layer stores the first UI. The one or more of the plurality of UIs 402 stored in the secondary interface layer 150 are associated with respective ones of the plurality of devices 105. For example, the one or more of the plurality of UIs 402 stored in the secondary interface layer 150 may be associated with respective ones of the plurality of devices 105 that are within a threshold proximity relative the first device 105a. In such non-limiting examples, the UIs of the secondary interface layer 150 are associated with those devices 105 that are in substantially close proximity to the device 105 associated with the first UI. In another example, the one or more of the plurality of UIs 402 stored in the secondary interface layer 150 may be associated with respective ones of the plurality of devices 105 that are within a threshold proximity relative the control device 110. In some non-limiting embodiments, additional interface layers may be provided such that each interface layer stores one or more UIs of additional devices. It will be appreciated that the devices corresponding to the UIs in the second interface layer 150 or an additional interface layer may include any devices in communication with the control device 110 and may not necessarily be within a threshold proximity relative to the control device 110.

As mentioned above, the first UI in the primary interface layer 145 may be automatically displayed on the control device 110. However, the one or more of the plurality of UIs 402 in the secondary interface layer 150 may be displayed in response to physical gestures by the user on the control device 110. For example, upon display of the first UI from the primary interface layer 145, the user may input a gesture (e.g., swiping finger on display screen) via the control device 110 to indicate a request for a change in the displayed UI. The gesture may be with respect to the display screen or a portion of the display screen, such as a particular zone on the display screen (e.g., a carousel zone of a UI, a control zone of a UI, and/or the like). In one non-limiting embodiment, the first device 105 controlled by the displayed first UI may not be the intended target of the user. In such a scenario, the user may input a gesture to the control device 110 to toggle between the one or more UIs in the secondary interface layer 150 until a desired UI for a particular one of the devices 105 is displayed on the control device 110.

Furthermore, in non-limiting embodiments, the primary interface layer 145 may include a carousel zone and a control zone. For example, a first UI of the plurality of UIs associated with a first device may be stored in the primary interface layer 145. The carousel zone may store a graphical icon associated with the first device and the control zone may store a graphical control interface associated with the first device. In such embodiment, the UI controller 130 actuates the carousel module to display the first UI responsive to identification of the first device (as will be described in more detail below). Display of the first UI includes display of the graphical icon from the carousel zone, where the graphical control interface from the control zone is displayed responsive to the displayed graphical icon. In one example, the graphical control interface may comprise multiple user interfaces within the control zone that may be manually scrolled through by the user. For example, for a smart TV device, the control zone may be a transitional graphical control interface that automatically or manually transitions between various portions of the graphical control interface as displayed on the control device 110.

The UI controller 130 is configured to actuate display on the control device 110 of select ones of the plurality of UIs 402 associated with respective ones of the plurality of devices 105. The plurality of UIs 402 are operable to control operation of the plurality of devices 105 by having one or more input settings pertaining to respective ones of the devices 105. For example, the input settings for a particular one of the UIs may include volume, channel, light intensity, ride sharing request button, and/or the like. Other types of input settings may be used and the examples provided herein are non-limiting.

In particular, the UI controller 130 may actuate the carousel module 140 to display the UI stored within the primary interface layer 145 and actuate display of one or more UIs stored in the secondary interface layer 150 responsive to a user input (e.g., a user command) via the control device 110. The user input may, for example, be a swiping gesture or any other physical interaction of the user on or with the control device 110, such as a gesture on a carousel zone of a UI or a gesture on a control zone of a UI. For example, in non-limiting embodiments, a user may gesture (such as a swipe, selection, and/or the like) or provide any other user input on a carousel zone of a user interface to select a device. In response to the user input, a first UI for the device may be displayed as a control zone. The carousel zone may be continued to be displayed on the UI and a further user input on the carousel zone may cause a second device to be selected and a first UI for the second device to be displayed as a control zone. Further, in non-limiting embodiments, a user input on a control zone of a first UI for a device may cause a second UI for that same device to be displayed as the control zone. For example, a user may swipe or provide some other user input on the control zone to change the control zone from a first UI for a device to a second UI for the same device. As another example, a user may swipe or provide some other user input on the carousel zone to change the control zone from a UI of a first device to a UI of a second device.

The UI controller 130 may be communicatively coupled to the control device 110 to cause display of the first UI in response to a determination by the system 100 that the first device 105a is targeted for control by the control device 110 or in response to selection of the first device 105a from the carousel interface. Furthermore, responsive to the control device 110 being in a "point and control" mode and the control device 110 pointing toward a vicinity of both the first and second devices 105a, 105b, the UI controller 130 initially actuates display of the first UI on the control device 110 while the UI controller 130 makes the second UI available for display on the control device 110. As will be described in more detail below, the first device 105a may have the greatest likelihood of being the intended targeted device 105 while the second device 105b has the second highest likelihood of being the intended targeted device.

The selection engine 135 is communicatively coupled to the carousel module 140, the UI controller 130, and the control device 110. The selection engine 135 is configured to define a spatial selection zone Z (FIG. 2) based on a location and orientation of the control device 110. The spatial selection zone Z includes a plurality of spatial coordinates having associated selection probabilities. The selection engine 135 is further configured to identify the first device 105a of the plurality of devices 105 located at a first one of the plurality of spatial coordinates having a first probability value. Additionally, the selection engine 135 is configured to identify the second device 105b located at a second one of the plurality of spatial coordinates having a second probability value of the selection probabilities. In one example, the second probability value is less than the first probability value. The selection probabilities refer to a probabilistic likelihood that a respective device 105 located in a particular spatial coordinate of the plurality of spatial coordinates was intended for control by the control device 110. It will be appreciated by those of ordinary skill in the art that more than the first and second devices 105a, 105b may be identified by the selection engine 135 within the spatial selection zone Z. The control device 110 may vary in location and orientation during use by the user. For each location and orientation of the control device 110, the selection engine 135 may determine the associated spatial selection zone Z.

In non-limiting embodiments, the selection engine 135 may identify all respective ones of the plurality of devices 105 that are within the spatial selection zone Z having a probability value within a defined probability threshold. For example, the selection engine 100 may operate to identify the spatial coordinates having probability values greater than a defined probability threshold (e.g., greater than 0.4). Then, each of the plurality of devices 105 having spatial coordinates or regions R (to be describe in more detail herein) that overlap with the identified spatial coordinates is classified as potential intended targeted devices 105 for control by the control device 110. In response to such determination, the carousel module 140 operates to store associated UIs of the potential targeted devices 105. In particular, the UI of the first device 105a mapped to the spatial coordinate with the highest probability value may be stored in the primary interface layer 145, while the UIs of remaining devices classified as potential target devices 105 are stored in the secondary interface layer 150. The UI controller 130 may automatically actuate display of the first UI from the primary interface layer 145, while actuating display of the UIs stored in the secondary interface layer 150 in response to the user's gesture (e.g., finger swipe on a display of the control device 110). Additional details of the spatial selection zone Z and the UI display based on selection probabilities will be described below with reference to FIGS. 2 and 4.

Figure 1B:
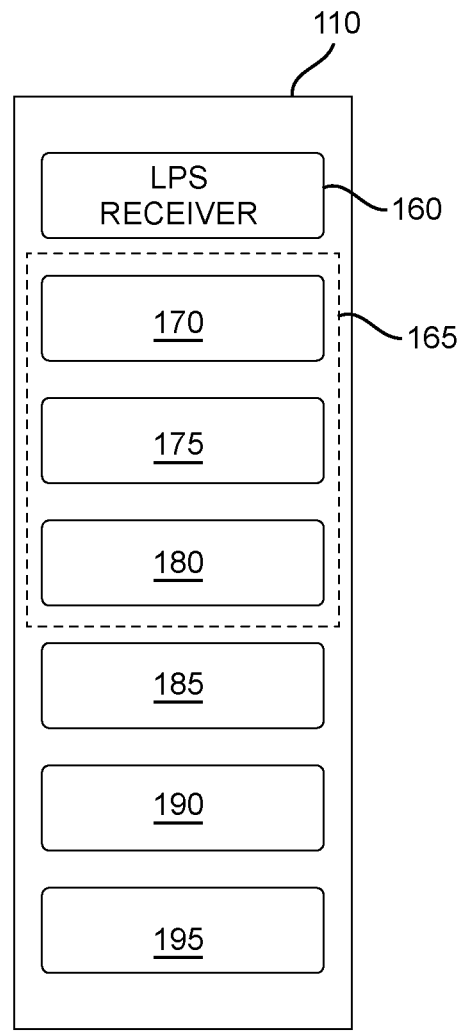
FIG. 1B is a block diagram illustrating a location positioning system (LPS) receiver and an inertial measurement unit embedded within the control device, according to one illustrated and non-limiting embodiment.

FIG. 1B shows a block diagram illustrating a local positioning system (LPS) receiver 160, an inertial measurement unit (IMU) 165, a distance sensor 185, an infrared (IR) transmitter 190, and a wireless transceiver 195 embedded within the control device 110, according to one illustrated and non-limiting embodiment.

The control device 110 may be a single remote control that operates as a universal controller for the plurality of devices 105. In some non-limiting embodiments, the control device 110 may take the form of a smart phone, tablet computer, wearable computing device, remote control, or any other computing device. The control device 110 is configured to display selective ones of the plurality of UIs 402 to control the plurality of devices 105. The respective ones of the plurality of UIs 402 selected for display on the control device 110 and/or for storage in the primary interface layer 145 and the secondary interface layer 150 is at least partially based on the selection zone determination by the selection engine 135. As mentioned above, the spatial selection zone Z is dynamically updated based on the real-time position and orientation of the control unit 110. Such real-time position and orientation information is calculated based, at least in part, on one or more of the LPS receiver 160, the IMU 165, the distance sensor 185, the IR transmitter 190, and the wireless transceiver 195 of the control device 110.

The LPS receiver 160 may, for example, be leveraged for indoor localization technologies such as ultra-wideband (UWB) or electro-magnetic field (EMF). The LPS receiver 160 used in UWB technology makes it possible to geolocate items indoors with an accuracy of the order of a few centimeters to a few tenths of a centimeter. The UWB technology may be capable of determining position in the order of 2.5 to 5 meters. The LPS receiver 160 may be in communication with the plurality of beacons 115, where the plurality of beacons 115 may utilize localization chips based on the UWB technology. As such, the plurality of beacons 115 may communicate wirelessly between each other and with the control device 110 to implement the local positioning system 100 using, for example, UWB technology. The localization of the beacons 115 may also be implemented based on lateration, tri-lateration, or multi-lateration techniques. It will be appreciated by those of ordinary skill in the art that the communication technology employed by the beacons 115 and the control unit 110 may include any other technology. As will be described in more detail below, because the control device 110 may be associated with the plurality of beacons 115, the control device 110 may leverage the known positioning of the beacons 115 to identify its own position relative to the beacons 115.

The IMU 165 may, for example, comprise one or more of a magnetometer 170, gyroscope 175, and accelerometer 180. The IMU 165 is configured to capture physical variables of the control device 110 in space and thus orientation. Capturing various physical variables of the control device 110 in space may advantageously improve accuracy of the orientation determination of the control device 110. The physical variables may, for example, be captured by one or more of the magnetometer 170, gyroscope 175, and accelerometer 180. The magnetometer 170 may be used in the local positioning system 100 when the EMF technology is leveraged. The magnetometer 170 may detect the direction, strength, or relative change of a magnetic field at the control device 110. The gyroscope 175 may additionally be leveraged for measuring or maintaining orientation and angular velocity of the control device 110. Finally, the accelerometer 180 may measure translational acceleration along three axes as well as rotation about the three axes.

The IR transmitter 190 and the wireless transceiver 195 may be leveraged by the control device 110 to transmit commands to the plurality of devices 105. For example, the control device 110 may transmit commands to the devices 105 via the IR transmitter 190 using IR communication protocols. In another example, the wireless transceiver 195 may be leveraged to transmit commands via Bluetooth®, Zigbee®, Wi-Fi®, UWB, or the like.

Various methods for determining the position of the control device 110 are contemplated by the disclosure. In a first non-limiting embodiment, a travel time of a radio signal between the control device 110 and the plurality of beacons 115 may be determined. For example, a technique of radio signal time of arrival (TOA) or time differences of arrival (e.g., TDOA) may be implemented. Alternatively and/or additionally, some non-limiting embodiments include calculating received power of a radio signal at the control device 110 or at the beacons 115. Alternatively and/or additionally, some non-limiting embodiments include determining angles of reception of the radio signals received at the control device 110 or at least one of the plurality of beacons 115. The angle of reception may advantageously allow for implementation of a triangulation by using at least one of the beacons 115. Alternatively and/or additionally, in some non-limiting embodiments, a measurement of electromagnetic fields at the control device 110 or at least one of the beacons 115 may be determined. Coupling the above positioning methods together with the captured physical variables of the control device 110 via the IMU 165, the position and orientation of the control device 110 may be identified.

Figure 2:
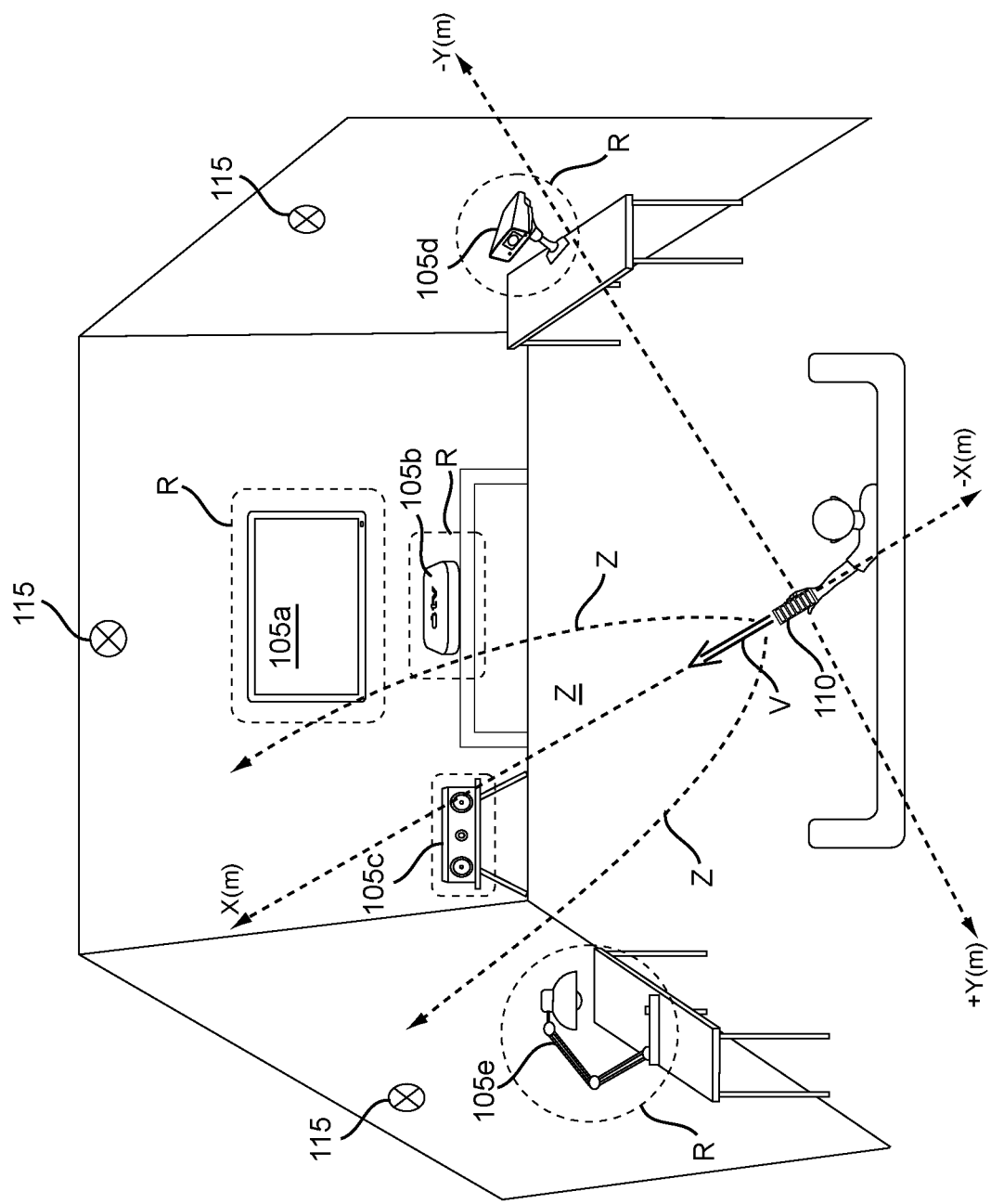
FIG. 2 is an example illustration of a spatial selection zone within an operating environment of the system, according to one illustrated and non-limiting embodiment.

FIG. 2 is an example illustration of the spatial selection zone Z within an operating environment of the system, according to one illustrated and non-limiting embodiment.

The interface module 120 may leverage the above positioning and orientation measurement methodologies to identify a region R for each of the devices 105. The region R may comprise a spatial area or volume associated with a particular one of the devices 105. A position of each of the plurality of devices 105 may also be identified by leveraging the ability to identify the location of the control device 110. In one non-limiting embodiment, the control device 110 may be placed in proximity with respective ones of the devices 105. When placed in proximity, the interface module 120, communicatively coupled to the beacons 115 and the control device 110, may identify the region R associated with the particular device 105. For example, the user of the control device 110 may indicate to the system 100 that implementation of defining the region R for one of the devices 105 will begin. As such, the interface module 120 may map the determined location of the control device 110 as the region R for the particular device 105. This methodology may be repeated for each of the plurality of devices 105. As such, the interface module 120 may store a mapping of the plurality of devices 105 with associated regions R.

In another non-limiting embodiment, the regions R associated with the devices 105 may or may not be a mirror of a respective device's 105 physical location. The regions R may encompass a spatial volume or area that is greater or less than the size of the actual device 105. For example, the user may bring the control device 110 to a location adjacent the desired device 105 to be mapped in the system 100. The adjacent location may be a desired distance away from the actual device 105 to be mapped. In one non-limiting embodiment, the control device 110 may be moved to multiple corners of the desired device 105 such that the interface module 120 creates the region R within the actual physical boundaries of the device 105 itself. In another non-limiting embodiment, the interface module 110 may be programmed to create a buffer zone outside the actual physical boundaries of the device 105 being mapped (as illustrated in FIG. 2). It will be appreciated by those of ordinary skill in the art that the above method may be implemented to create the regions R at any desired location of the user, irrespective of the actual physical location of the device 105 being mapped into the interface module 120 of the system 100.

For example, the user may wish to create the region R for a particular device 105 at an upstairs location (e.g., a space on an upstairs wall, window, doorway, refrigerator, etc.) where the user frequents on a more regular basis, while the device 105 is physically located at a downstairs location. As another example, the user may wish to associate the region R of a particular device 105 with an entire wall area. As an alternative example, where multiple devices 105 are substantially proximate the other, the user may cause the system 100 to define the respective regions R for each of those proximate devices 105 more narrowly. In other words, regions R associated with such devices 105 may be substantially the same size of the physical devices 105 or less than the actual physical size of the devices 105. Furthermore, it will be appreciated that the regions R described herein may be of two-dimensional (2D) space or three-dimensional (3D) space.

The interface module 120 may be communicatively coupled to the control device 110 and/or the plurality of beacons 115. The interface module 120 may extrapolate from the real-time positioning and orientation measurements of the control device 110 a selection zone vector V representing a defined distance and direction from the control device 110. The selection zone vector V may, for example, point outwardly in one direction from a point on the control device 110. Based on the selection zone vector V, the interface module 120 may further extrapolate the spatial selection zone Z. The spatial selection zone Z may comprise a spatial area surrounding the selection zone vector V. For example, the zone may be a 2D or 3D spatial field encompassing a defined distance around the selection zone vector V. As illustrated in FIG. 2, the spatial selection zone Z of the control device 110, at the captured moment in time, is highlighted by parabolic dotted arrows stemming from the control device 110 and extending along a positive X(m) axis of the vector V, as well as extending around the +Y(m) and −Y(m) axes of both sides of the vector V. Although a parabolic shaped selection zone Z is illustrated and referred to herein, the selection zone Z may encompass any function or shape (e.g., elliptical, circle, square, etc.). Additionally, it will be noted that the extrapolation of the spatial selection zone Z based on the position and orientation of the control device 110 may be a defined extrapolation. The extrapolation may be dynamically refined during subsequent operation of the system 100. In one non-limiting embodiment, as the user manipulating the control device 110 becomes more accurate over time, the system 100 may dynamically alter the extrapolation technique to define the spatial selection zone Z. An as example, if the user becomes more accurate at pointing to a target device 105, the system 100 may extrapolate the spatial selection zone Z as having smaller variations around the +X(m) axis to encompass a more narrow spatial volume.

Figure 3:
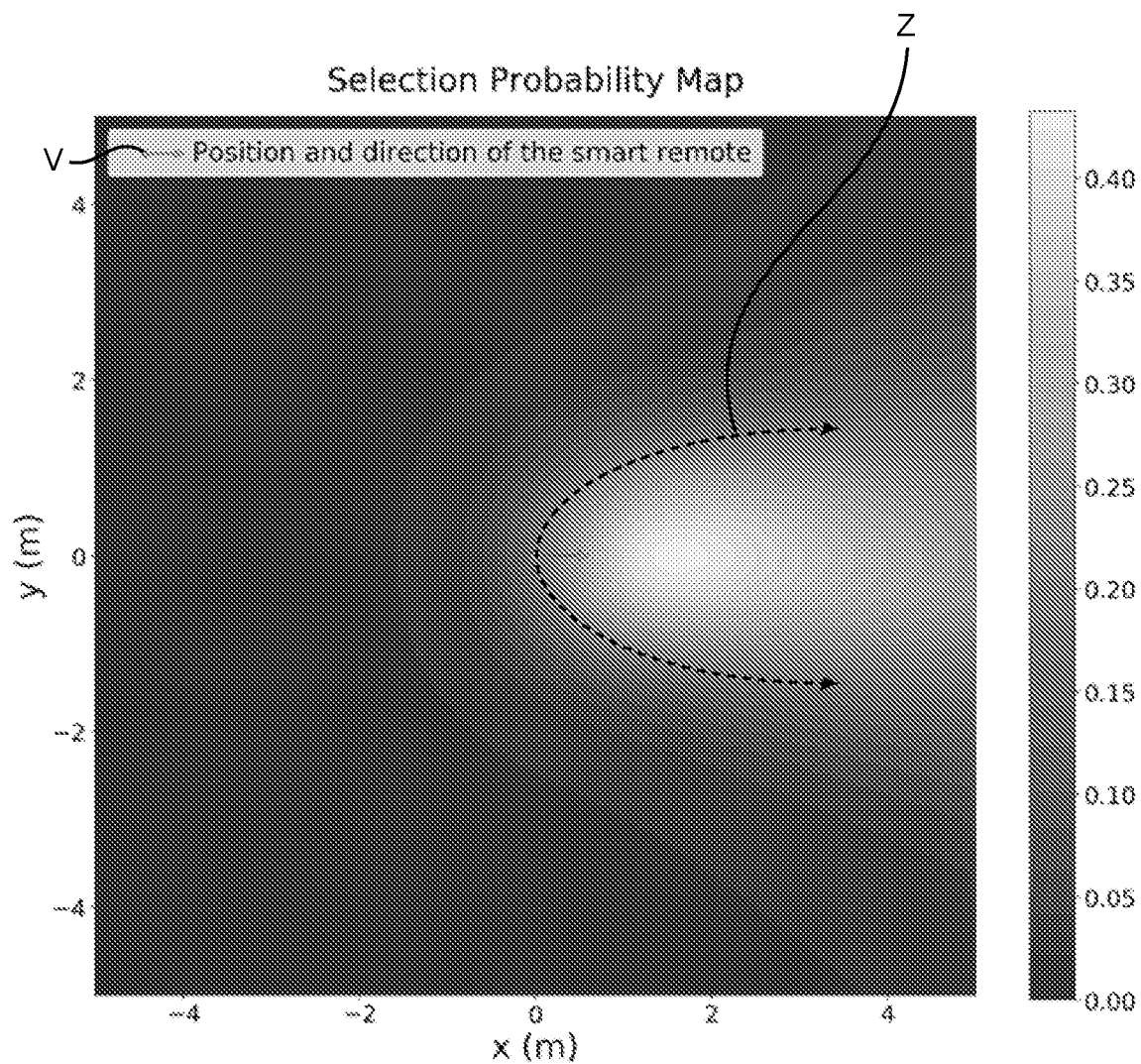
FIG. 3 is an example illustration of a selection probability map for the spatial selection zone associated with a particular location and orientation of the control device, according to one illustrated and non-limiting embodiment.

FIG. 3 shows an example illustration of a selection probability map for the spatial selection zone Z associated with a particular location and orientation of the control device 110, according to one illustrated and non-limiting embodiment.

The spatial selection zone Z is dynamically updated as the control device 110 being operated moves in space, in response to the user movement. As mentioned above, the selection engine 135 is configured to define the spatial selection zone Z based on the location and orientation of the control device 110. The spatial selection zone includes the plurality of spatial coordinates having associated selection probabilities. The selection probabilities refer to a probabilistic likelihood that the respective device 105 located in a particular spatial coordinate (e.g., X,Y or X,Y,Z) of the plurality of spatial coordinates was intended for control by the control device 110. In this manner, the plurality of spatial coordinates (e.g., 3D or 2D coordinates) comprise points in space having variable likelihoods that a particular point in space is being pointed at by the control device 110. In the example illustration of FIG. 3, portions of the spatial selection zone Z having highest probability appear in a first shading (e.g., a yellow color shading) while portions of the spatial selection zone Z having substantially zero probability appear in the second shading (e.g., a purple color shading). It will be appreciated that the black and white version of FIG. 3 may illustrate the high probability areas approaching a white or light grey color, while the lower probability areas approach a dark color. In one example, a probability value greater than 0.4 may be considered highly likely, while a probability value less than 0.2 may be deemed highly unlikely. Of course, it will be appreciated by those of ordinary skill in the art that the exact probabilistic values may be different and the considerations for areas being deemed likely and unlikely targets may vary.

In response to real-time determination of the spatial selection zone Z, the interface module 120 may determine whether any of the regions R, having been mapped to respective devices 105, are encompassed at least in part within the spatial selection zone Z. If a single one of the devices 105 is at least partially encompassed in the selection zone Z, then the UI associated with that device 105 is automatically displayed on the control device 110. In the non-limiting example shown in FIG. 2, if the control device 110 were pointing directly toward the lamp device 105e, then the UI 402d associated with controlling the lamp device 105e may be displayed on the control device 110.

In an alternative non-limiting embodiment, there may be more than one device 105 located within the spatial selection zone Z. Such a non-limiting embodiment can be shown with respect to FIG. 2. The regions R associated with the devices 105 may have been mapped in the interface module 120, for example, by the selection engine 135. The selection engine 135 may identify, in real-time, the three regions R associated with the devices 105c, 105a, and 105b as being at least partially included within the spatial selection zone Z. In response to such determination, the selection engine 135 may determine the probability values associated with each of the devices 105c, 105a, and 105b. In particular, the spatial coordinates of the regions R associated with the devices 105c, 105a, and 105b may be identified in the spatial selection zone Z. As such, the probability values associated with the particular spatial coordinates are identified by the selection engine 135 and used to stack rank the devices 105c, 105a, and 105b based on likelihood of intended selection by the user. The selection engine 135 may identify a first device D1 having highest likelihood of intended selection as being the device 105c, while a second device D2 having a second highest likelihood of intended selection as being the device 105b. Alternatively and/or additionally, a third device D3 having a third highest likelihood of intended selection may be determined. For example, in the FIG. 2 example, the third device D3 may comprise the device 105a.

As described above, the first UI 402a associated with the first device D1 may be stored in the primary interface layer 145 of the carousel module 140. On the other hand, the second device D2 and the third device D3 may have the respective second and third UIs 402b, 402c stored in the secondary interface layer 150.

According to non-limiting embodiments, the UI controller 130 may actuate the carousel module 140 to display the first UI 402a (associated with the first device D1) stored within the primary interface layer 145 on the control device 110. The display of the first UI 402a on the control device 110 may occur in response to identification of the first device D1 having a first value equating to the highest probability value of all selection probabilities. Furthermore, the UI controller 130 may actuate alternate display of the second and third UIs 402b, 402c (associated with the second device D2 and the third device D3, respectively) stored in the secondary interface layer 150 on the control device 110. In particular, as will be described in more detail below, the second UI 402b or the third UI 402c may be alternately displayed on the control device 110 responsive to the user command via the control device 110. In particular, upon initial display of the first UI 402a on the control device 110, the user may effectively override the displayed first UI 402a with the second UI 402b or the third UI 402c by way of the user command. The user command may, for example, be a swiping gesture or any other physical interaction of the user with the control device 110. In such example, the user may desire to override the first UI 402a with either the second or third UIs 402b, 402c because the intended target device 105 to be controlled may have been the second device D2 or the third device D3. The second device D2 and/or the third device D3 may be in substantially close proximity to the first device D1. For example, the second device D2 and the third device D3 may have associated second and third selection probability values that are within a defined threshold variance from the first probability value associated with the first device D1. In some non-limiting embodiments, the defined threshold probability variance between devices within proximity of the other may be defined by the user or automatically set by the system 100.

The secondary interface layer 150 may include any number of UIs 402 associated with further devices 105. The number of UIs stored in the secondary interface layer 150 for display on the control device 110 in response to the user gesture depends on the defined threshold probability variance between the first device D1 and other devices 105. For example, responsive to the defined probability variance being substantially high, there may be a large number of device UIs included within the secondary interface layer 150. On the other hand, a low defined probability variance may amount to only a small number of device UIs being included within the secondary interface layer 150.

Figure 4A:
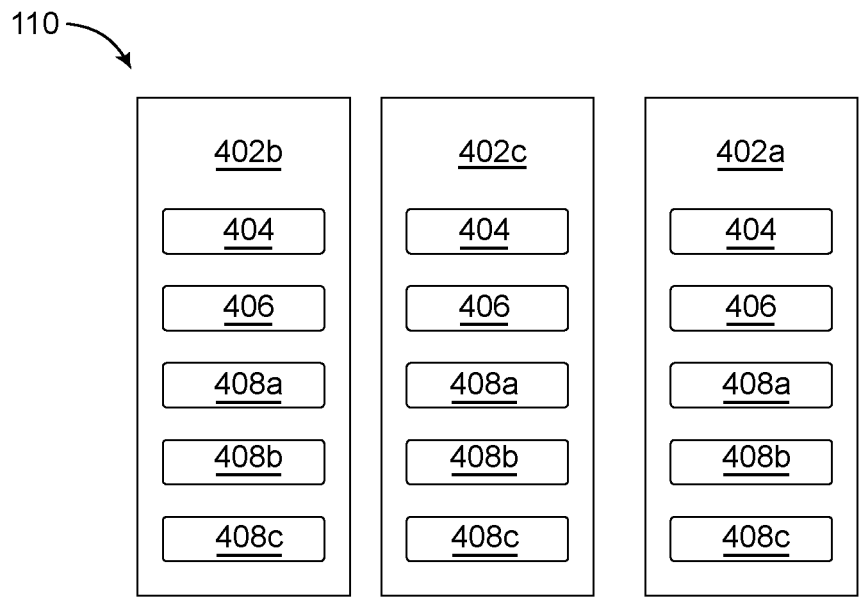
FIG. 4A is a schematic illustration of a plurality of user interfaces stored within a primary interface layer and a secondary interface layer of the carousel module, according to one illustrated and non-limiting embodiment.
Figure 4B:
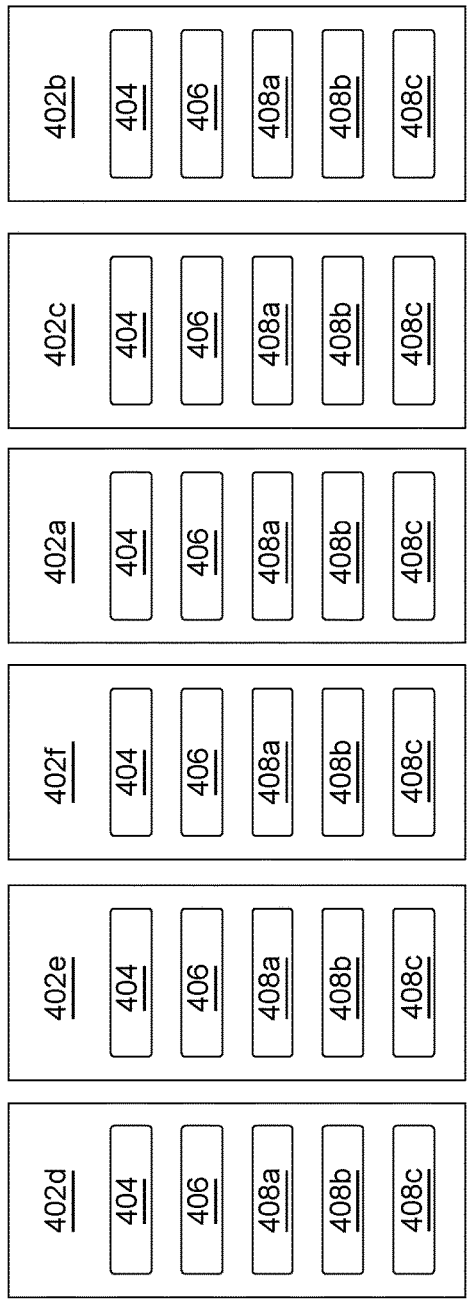
FIG. 4B is a schematic illustration of a plurality of user interfaces stored within the carousel module is in "fixed" mode, according to one illustrated and non-limiting embodiment.

FIG. 4A shows a schematic illustration of a plurality of user interfaces 402a-c (collectively referenced 402) stored within the primary interface layer 145 and the secondary interface layer 150 of the carousel module 140, according to one illustrated and non-limiting embodiment. FIG. 4B is a schematic illustration of the plurality of user interfaces 402a-f (also collectively referenced 402) stored within the carousel module 140 while the carousel module 140 is in "fixed" mode, according to one illustrated and non-limiting embodiment.

As mentioned above, the UI controller 130 is configured to actuate display on the control device 110 of select ones of the plurality of UIs 402 associated with respective ones of the plurality of devices 105. The plurality of UIs 402 are operable to control operation of the plurality of devices 105 by having one or more input elements or settings pertaining to respective ones of the devices 105. In one non-limiting embodiment, respective ones of the plurality of interfaces 402 may include data and interface modules implemented as graphical user interfaces configured to invoke control functions of the associated plurality of devices 105. Each of the interfaces 402 may comprise a label module 404 configured to communicate the particular device 105 being controlled by the control device 110 and/or a subset of interface functions included in the respective interface 402. In the non-limiting example illustrated in FIG. 4A, the label modules 404 of the UIs 402b, 402c, 402a, respectively, indicate an APPLE® TV device, SAMSUNG® Smart TV, and a sound system being controlled by the control device 110.

The plurality of UIs 402 may additionally include one or more data items 406 indicating a status of the device 105 being controlled by the particular UI 402. For example, the status of the device 105 may indicate whether the interface module 120 is operating in a "point and control" mode or a "fixed" mode, as will be described below. Each of the plurality of UIs 402 may further include one or more input elements 408a-c configured as defined functions performed in response to selection of respective ones of the input elements 408a-c. The input elements 408a-c may, for example, take the form of buttons, sliders, data entry fields, or the like. In the non-limiting example shown in FIG. 5A, the input elements 408a-c take the form of channel buttons, volume buttons, and arrows to name a few. An executable code for each of the UIs 402 may define functions performed in response to selection of respective ones of the input elements 408a-c. The executable code for respective UIs 402 may manage exchange of data with a corresponding one of the devices 105 being controlled.

Figure 5A:
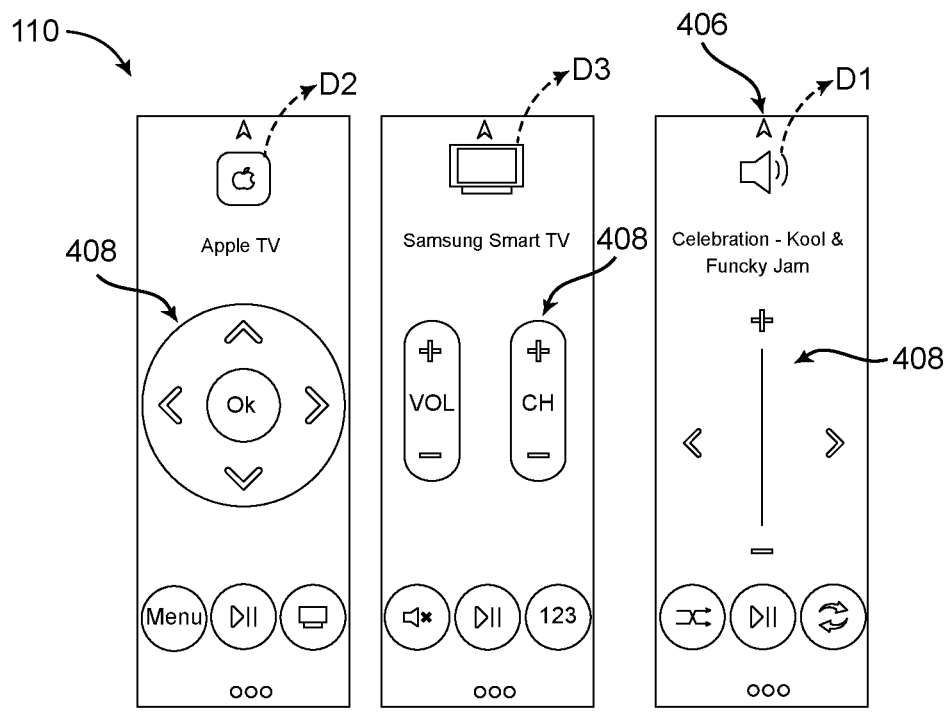
FIG. 5A is a series of example screenshots of the plurality of user interfaces stored within the primary interface layer and the secondary interface layer and displayed on the control devices when the carousel module operates in "point and control" mode, according to one illustrated and non-limiting embodiment.

FIG. 5A shows a series of example screenshots of the plurality of user interfaces 402 stored within the primary interface layer 145 and the secondary interface layer 150 and displayed on the control device 110 when the carousel module 140 operates in "point and control" mode, according to one illustrated and non-limiting embodiment.

Figure 5B:
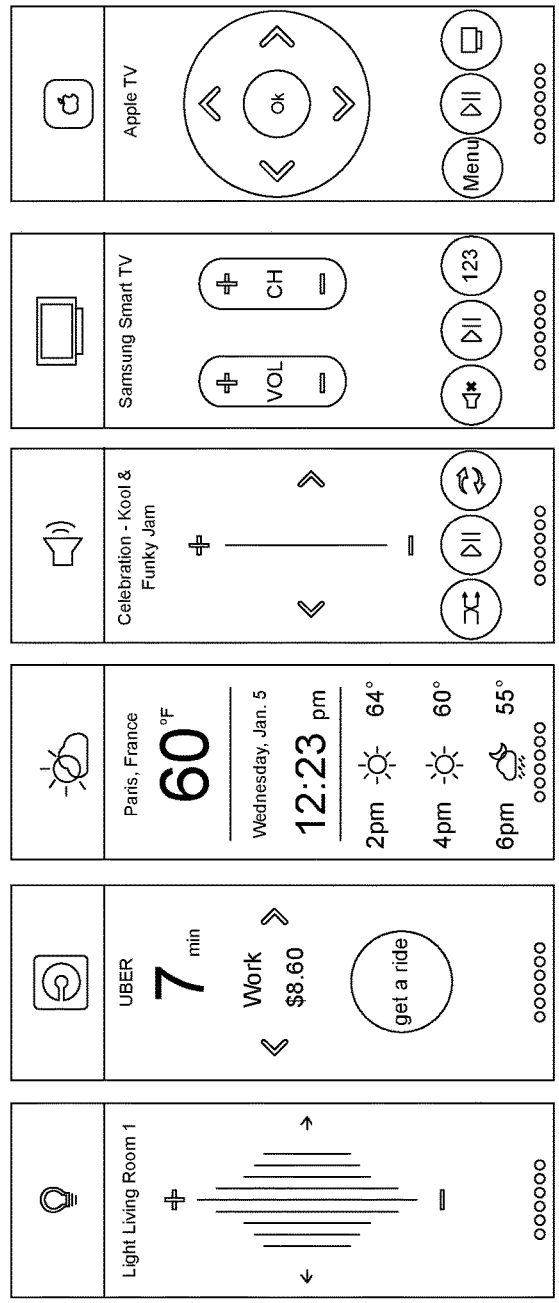
FIG. 5B is a series of example screenshots of the plurality of user interfaces displayed on the control device while the carousel module operates in "fixed" mode, according to one illustrated and non-limiting embodiment.

FIG. 5B shows a series of example screenshots of the plurality of user interfaces 402 alternately displayed on the control device 110 while the carousel module 140 operates in "fixed" mode, according to one illustrated and non-limiting embodiment.

In non-limiting embodiments, during operation of the control device 110, the user may activate the system 100 to operate in "point and control" mode (e.g., an automatic operating mode) or "fixed" mode (e.g., a manual operating mode). "Point and control" mode may refer to the selection engine 135 operating in real-time to determine the devices 105 the control device 110 is targeting for control. As described above, the selection engine 135 is configured to define the spatial selection zone Z based on the location and orientation of the control device 110. The spatial selection zone Z includes the plurality of spatial coordinates having associated selection probabilities. The selection probabilities refer to a probabilistic likelihood that the respective device 105 (or associated region R) located at one or more particular spatial coordinates (e.g., X,Y or X,Y,Z) of the plurality of spatial coordinates was intended for control by the control device 110. In response to real-time determination of the spatial selection zone Z, the interface module 120 may determine whether any of the regions R, having been mapped to respective devices 105, are encompassed at least in part within the spatial selection zone Z.

The selection engine 135 may identify, in real-time, the three regions R associated with the devices 105c, 105a, and 105b as being at least partially included within the spatial selection zone Z. In response to such determination, the selection engine 135 may determine the probability values associated with each of the devices 105c, 105a, and 105b. As described above, these probability values associated with the particular spatial coordinates are identified by the selection engine 135 and used to stack rank the devices 105c, 105a, and 105b based on likelihood of intended selection by the user. The selection engine 135 may identify the first device D1 having highest likelihood of intended selection as being the device 105c, while the second device D2 having a second highest likelihood of intended selection as being the device 105b. Alternatively and/or additionally, the third device D3 having a third highest likelihood of intended selection may be determined as device 105a.

As illustrated in the non-limiting example of FIG. 5A, the UI controller 130 may actuate the carousel module 140 to display the first UI 402a (associated with the first device D1) stored within the primary interface layer 145 on the control device 110, responsive to identifying the first device D1 as having the first probability value (i.e., highest probability value of all selection probabilities). However, responsive to the user gesture on the control device 110, the UI controller 130 may actuate display on the control device 110 of the second and third UIs 402b, 402c (associated with the second device D2 and the third device D3, respectively) stored in the secondary interface layer 150.

In particular, the UIs 402a-c may be arranged in a loop configuration. Initially, the first UI 402a may be automatically displayed on the control device 110. Responsive to the user command (e.g., swiping gesture), the second UI 402b may override the first UI 402a and thus appear on the control device 110 display. Responsive to another user gesture or command on the control device 110, the third UI 402c may be displayed. Furthermore, a subsequent user gesture may cause the first UI 402a to reappear on the control device display. As such, the UIs 402a-c may be displayed sequentially as the user scrolls through the loop arrangement of the UIs 402a-c.

In the non-limiting embodiment illustrated in FIG. 5B, the carousel module 140 is configured to operate in the "fixed" mode. The "fixed" mode may refer to the UI controller 130 actuating display of respective ones of the UIs 402 in response to the user command without consideration of the spatial selection zone Z or the selection probabilities associated with spatial coordinates within the spatial selection zone Z. In other words, display of the UIs 402 may be actuated in response to manual selection by the user of the control device 110. For example, all the UIs 402 associated with the plurality of devices 105 may be distributed and stored in the primary interface layer 145 and/or the secondary interface layer 150. In particular, the UI controller 130 may actuate display of respective ones of the plurality of UIs 402 in response to the user gesture on the control device 110. For example, the user may implement a swiping motion on the control device 110 display to actuate scrolling between the UIs 402. The order of the UIs 402 in the loop arrangement may be random. In another non-limiting embodiment, the order of the UIs 402 stored in the loop arrangement may be based on a frequency of use of respective UIs 402. In one non-limiting embodiment, a most recently displayed UI 402 may be initially displayed on the control device 110.

In non-limiting embodiments, the carousel module 140 may be actuated to operate in the "point and control" mode or the "fixed mode" in response to a swiping gesture or any other physical gesture on the control device 110 by the user. An indication of the mode of operation may be on the control device 110 via the one or more data items 406.

In non-limiting embodiments, a microphone may be used to receive a voice input from a user. For example, the control device 110 may include a microphone integrated therein or a microphone on another device (such as a mobile device) may be used. The control device 110 may be configured to process the voice input into one or more commands that are transmitted to one or more devices 105. In non-limiting embodiments, the control device 110 is configured to generate a command based on the voice input and a particular target device. As an example, the control device 110 may generate a command based on the voice input for the device corresponding to a UI that is being displayed. If a UI for a first device is displayed on the control device 110, for example, a voice input to "increase volume" or "turn off" may be processed to generate a corresponding command for the first device. Similarly, if a UI for a second device is displayed on the control device 110, a voice input may be processed to generate a corresponding command for the second device.

Figure 6:
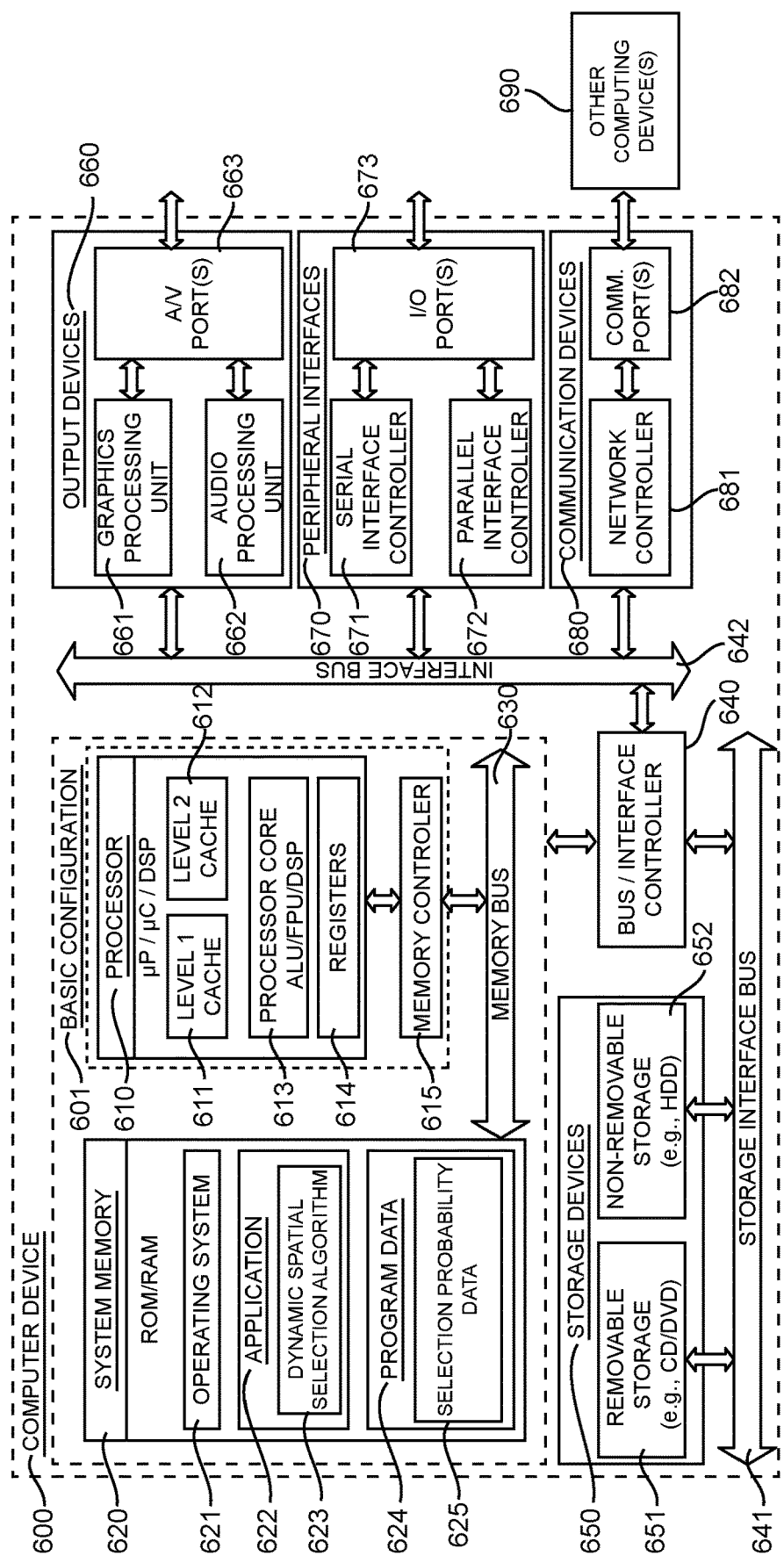
FIG. 6 is a block diagram illustrating an example interface module arranged for determining the spatial selection zone based on a location and orientation of the control device, according to one illustrated and non-limiting embodiment.

FIG. 6 is a block diagram illustrating an example interface module 120 in the form of a computer device 600 arranged for determining the spatial selection zone Z based on a location and orientation of the control device, and actuating display of the respective UIs 402 on the control device 110 in accordance with non-limiting embodiments of the present disclosure. In a very basic configuration 601, the computer device 600 typically includes one or more processors 610 and system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 may include one more levels of caching, such as a level one cache 611 and a level two cache 612, a processor core 613, and registers 614. An example processor core 613 may include an arithmetic logic unit (ALU), a floating point unit (FPU), a digital signal processing core (DSP Core), or any combination thereof. An example memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.), or any combination thereof. System memory 620 may include an operating system 621, one or more applications 622, and program data 624. Application 622 may include a dynamic spatial selection algorithm (DSSA) 623 that is arranged to define the spatial selection zone Z associated with the location and orientation of the control device 110. Program data 624 includes selection probability data, position and orientation data of the control device 110, regions R associated with respective ones of the devices 105, and other data 625 that is useful to identify the one or more devices 105 intended to be controlled by the user and stack rank the UIs 402 associated with the one or more devices 105 based on selection probabilities, as described above. In some non-limiting embodiments, application 622 may be arranged to operate with program data 624 on an operating system 621 such that the first UI 402a of the first device D1 having the greatest probability of intended selection by the user is displayed on the control device 110, with an option for the user to manually gesture or swipe the control device 110 to alternatively display other ones of the UIs 402b, 402c associated with devices 105 having less probability of intended selection. This described basic configuration is illustrated in FIG. 6 by those components within dashed line 601.

The computer device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 620, removable storage 65,1 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computer device 600. Any such computer storage media may be part of device 600.

Computer device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 (e.g., control device 110, device 105, beacon 115) over a network communication link via one or more communication ports 682.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computer device 600 may be implemented as a portion of a small-form factor portable (or mobile) electronic device such as a cell phone, a personal media player device, a wireless web-watch device, a personal headset device, an application specific device, or a hybrid device that includes any of the above functions. Computer device 600 may also be implemented as a personal computer including both laptop computer and non-laptop computer configurations. In another example, the computer device 600 may be a cloud-based server system communicatively coupled to the control device 110 and the beacons 115 via the network 125.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the above descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

What is claimed is:

1. A system for controlling a plurality of devices, comprising:
   a remote control device comprising a display and a processor, the processor configured to:
   generate, on the display, a carousel zone comprising at least a subset of graphical icons of a plurality of graphical icons, wherein each graphical icon of the plurality of graphical icons is associated with a respective device of the plurality of devices;
   determine a first target device and a second target device from the plurality of devices based on at least one of: (i) receiving a selection by a user of a graphical icon of the at least one graphical icon displayed on the carousel zone, and (ii) detecting the first target device and/or second target device with a sensor in communication with the remote control device;
   generate, on the display, a first user interface based on the first target device, the first user interface associated with a first set of commands;
   in response to a user input, generate, on the display, a second user interface based on the second target device, the second user interface associated with a second set of commands;
   control the first target device based on the first set of commands; and
   control the second target device based on the second set of commands;
   wherein a spatial selection zone includes a plurality of spatial coordinates having associated selection probabilities, and wherein the processor is further configured to:
   identify a first device located at first spatial coordinates of the plurality of spatial coordinates, the first spatial coordinates having a first probability value;
   identify a second device located at second spatial coordinates of the plurality of spatial coordinates, the second spatial coordinates having a second probability value; and
   determine that a difference between the second probability value and the first probability value is less than a threshold value; and
   display, on the carousel zone, a first graphical icon corresponding to the first device and a second graphical icon corresponding to the second device, wherein the first target device is selected based on a user selection of the first graphical icon or the second graphical icon.

2. The system of claim 1, wherein the user input comprises a physical gesture on or with the remote control device.

3. The system of claim 1, wherein the first user interface is stored as a primary interface layer and the second user interface is stored as a secondary interface layer.

4. The system of claim 3, wherein the processor is further configured to: in response to a second gesture, generate, on the display, a third user interface based on a third target device, the third user interface associated with a third set of commands.

5. The system of claim 1, wherein the first target device is determined based on detecting the first target device with the sensor in communication with the remote control device, and wherein the processor is configured to determine the first target device based on a location and orientation of the remote control device.

6. The system of claim 5, wherein the processor is further configured to define the spatial selection zone based on the location and orientation of the remote control device.

7. The system of claim 6, wherein the spatial selection zone includes a plurality of spatial coordinates having associated selection probabilities, and wherein the processor is further configured to:
   identify a first device located at first spatial coordinates of the plurality of spatial coordinates, the first spatial coordinates having a first probability value;
   identify a second device located at second spatial coordinates of the plurality of spatial coordinates, the second spatial coordinates having a second probability value; and
   determine that the second probability value is less than the first probability value, wherein the target device is determined to be the first device based on the second probability value being less than the first probability value.

8. The system of claim 7, wherein the processor is further configured to determine the first probability value and the second probability value based on a dynamic spatial selection algorithm.

9. The system of claim 6, wherein the sensor comprises an inertial measurement unit (IMU) configured to identify the orientation of the remote control device.

10. The system of claim 1, further comprising a microphone configured to receive a voice input from a user, wherein the processor is further configured to:
    process the voice input into a command based on at least one of the first target device and the second target device; and
    control at least one of the first target device and the second target device based on the command.

11. The system of claim 10, wherein the process is further configured to determine between the first target device and the second target device for processing the voice input into the command based on whether the first user interface or the second user interface is displayed.

12. The system of claim 1, wherein the plurality of devices are smart devices interconnected through at least one wireless network.

13. The system of claim 1, wherein the carousel zone is displayed on a main user interface, and wherein the first user interface and second user interface are displayed as a control zone on the main user interface.

14. The system of claim 1, wherein the processor is further configured to: in response to a gesture on the first user interface, generate, on the display, a third user interface based on the first target device, the third user interface associated with a third set of commands configured to control the first target device, wherein the third set of commands are different from the first set of commands.

15. A method for controlling a plurality of devices, comprising:
generating, on a display of a remote control device, a carousel zone comprising at least a subset of graphical icons of a plurality of graphical icons, wherein each graphical icon of the plurality of graphical icons is associated with a respective device of the plurality of devices;
determining, with the remote control device, a first target device and a second target device from the plurality of devices based on at least one of: (i) receiving a selection by a user of a graphical icon of the at least one graphical icon displayed on the carousel zone, and (ii) detecting the first target device and/or second target device with a sensor in communication with the remote control device;
generating, on the display of the remote control device, a first user interface based on the first target device, the first user interface associated with a first set of commands;
in response to a user input, generate, on the display of the remote control device, a second user interface based on the second target device, the second user interface associated with a second set of commands;
control, with the remote control device, the first target device based on the first set of commands; and
control, with the remote control device, the second target device based on the second set of commands;
wherein a spatial selection zone includes a plurality of spatial coordinates having associated selection probabilities, and the method further comprises:
identifying a first device located at first spatial coordinates of the plurality of spatial coordinates, the first spatial coordinates having a first probability value;
identifying a second device located at second spatial coordinates of the plurality of spatial coordinates, the second spatial coordinates having a second probability value;
determining that a difference between the second probability value and the first probability value is less than a threshold value; and
displaying, on the carousel zone, a first graphical icon corresponding to the first device and a second graphical icon corresponding to the second device, wherein the first target device is selected based on a user selection of the first graphical icon or the second graphical icon.

16. The method of claim 15, wherein the user input comprises a physical gesture on or with the remote control device.

17. The method of claim 15, wherein the first user interface is stored as a primary interface layer and the second user interface is stored as a secondary interface layer.

18. The method of claim 17, further comprising: in response to a second gesture, generating, on the display, a third user interface based on a third target device, the third user interface associated with a third set of commands.

19. The method of claim 15, wherein the first target device is determined based on detecting the first target device with the sensor in communication with the remote control device, the method further comprises determining the first target device based on a location and orientation of the remote control device.

20. The method of claim 19, further comprising defining a spatial selection zone based on the location and orientation of the remote control device.

21. The method of claim 20, wherein the spatial selection zone includes a plurality of spatial coordinates having associated selection probabilities, the method further comprising:
identifying a first device located at first spatial coordinates of the plurality of spatial coordinates, the first spatial coordinates having a first probability value;
identifying a second device located at second spatial coordinates of the plurality of spatial coordinates, the second spatial coordinates having a second probability value; and
determining that the second probability value is less than the first probability value, wherein the target device is determined to be the first device based on the second probability value being less than the first probability value.

22. The method of claim 21, further comprising determining the first probability value and the second probability value based on a dynamic spatial selection algorithm.

23. The method of claim 20, wherein the sensor comprises an inertial measurement unit (IMU) configured to identify the orientation of the remote control device.

24. The method of claim 15, further comprising:
processing a voice input into a command based on at least one of the first target device and the second target device; and
controlling at least one of the first target device and the second target device based on the command.

25. The method of claim 24, further comprising determining between the first target device and the second target device for processing the voice input into the command based on whether the first user interface or the second user interface is displayed.

26. The method of claim 15, wherein the plurality of devices are smart devices interconnected through at least one wireless network.

27. The method of claim 15, wherein the carousel zone is displayed on a main user interface, and wherein the first user interface and second user interface are displayed as a control zone on the main user interface.

28. The method of claim 15, further comprising: in response to a gesture on the first user interface, generating, on the display, a third user interface based on the first target device, the third user interface associated with a third set of commands configured to control the first target device, wherein the third set of commands are different from the first set of commands.

* * * * *